(12) United States Patent
Sugimoto et al.

(10) Patent No.: US 7,082,442 B2
(45) Date of Patent: Jul. 25, 2006

(54) METHOD AND SYSTEM FOR RESOLVING DISARRANGEMENT IN DATABASE

(75) Inventors: Yuki Sugimoto, Sagamihara (JP); Yukio Nakano, Oyama (JP); Nobuo Kawamura, Atsugi (JP)

(73) Assignee: Hitachi, Ltd., Tokyo (JP)

( * ) Notice: Subject to any disclaimer, the term of this patent is extended or adjusted under 35 U.S.C. 154(b) by 579 days.

(21) Appl. No.: 10/377,950

(22) Filed: Feb. 28, 2003

(65) Prior Publication Data

US 2004/0153777 A1 Aug. 5, 2004

(30) Foreign Application Priority Data

Nov. 6, 2002 (JP) ............................. 2002-322280

(51) Int. Cl.
*G06F 12/00* (2006.01)

(52) U.S. Cl. .......................................... 707/200; 707/2

(58) Field of Classification Search ................ 707/1–3, 707/7, 8, 10, 100–104.1, 200–202, 204; 700/1, 700/11, 17, 18; 710/1, 5, 20, 52; 711/1, 711/4, 5, 100, 117; 712/1, 23, 216–218; 714/1, 2, 15, 10, 100
See application file for complete search history.

(56) References Cited

U.S. PATENT DOCUMENTS

| 5,765,167 | A | * | 6/1998 | Kiuchi et al. ............... 707/200 |
| 6,442,547 | B1 | * | 8/2002 | Bowman-Amuah .......... 707/10 |
| 6,584,474 | B1 | | 6/2003 | Pereira |
| 6,606,631 | B1 | | 8/2003 | Martin, Jr. et al. |
| 6,633,884 | B1 | | 10/2003 | Martin, Jr. et al. |
| 6,732,027 | B1 | * | 5/2004 | Betters et al. ................ 701/29 |
| 6,760,684 | B1 | * | 7/2004 | Yang et al. .................. 702/182 |
| 2002/0091672 | A1 | | 7/2002 | Vos et al. |

FOREIGN PATENT DOCUMENTS

JP  11-161525  6/1999

\* cited by examiner

*Primary Examiner*—Greta Robinson
*Assistant Examiner*—Harold E. Dodds, Jr.
(74) *Attorney, Agent, or Firm*—Townsend and Townsend and Crew LLP

(57) ABSTRACT

A method of eliminating disturbance of database storage areas is provided, which includes the steps of: checking if it is time to execute database storage status analysis; analyzing a state of database storage areas and outputting values corresponding to disturbance factors as a status analysis result; checking whether each of the disturbance factors has reached a state that requires to be eliminated; and referring to an association table matching disturbance resolution processing with factors to be eliminated by the processing and selecting appropriate processing that can eliminate the disturbance caused by the factor.

23 Claims, 13 Drawing Sheets

FIG.2

PROCESSING/FACTOR ASSOCIATION TABLE 112

| 122 | STORAGE EFFICIENCY | FORWARDED ROWS | 0% UTILIZATION |
|---|---|---|---|
| 301 REORGANIZATION | ○ | ○ | ○ |
| 302 ONLINE REORGANIZATION | ○ | ○ | ○ |
| 303 FORWARDED ROW RECLAMATION | × | ○ | × |
| 304 EMPTY PAGE RECLAMATION | × | × | ○ |
| 305 UNUSED SPACE REUSE | ○ | × | ○ |

PRIORITY TABLE 115

| 122 | ACCESS BLOCKING | LOAD |
|---|---|---|
| 305 UNUSED SPACE REUSE | NOT REQUIRED | SMALL |
| 304 EMPTY PAGE RECLAMATION | NOT REQUIRED | ↓ |
| 303 FORWARDED ROW RECLAMATION | NOT REQUIRED | ↑ |
| 302 ONLINE REORGANIZATION | NOT REQUIRED | LARGE |
| 301 REORGANIZATION | REQUIRED | — |

401, 402

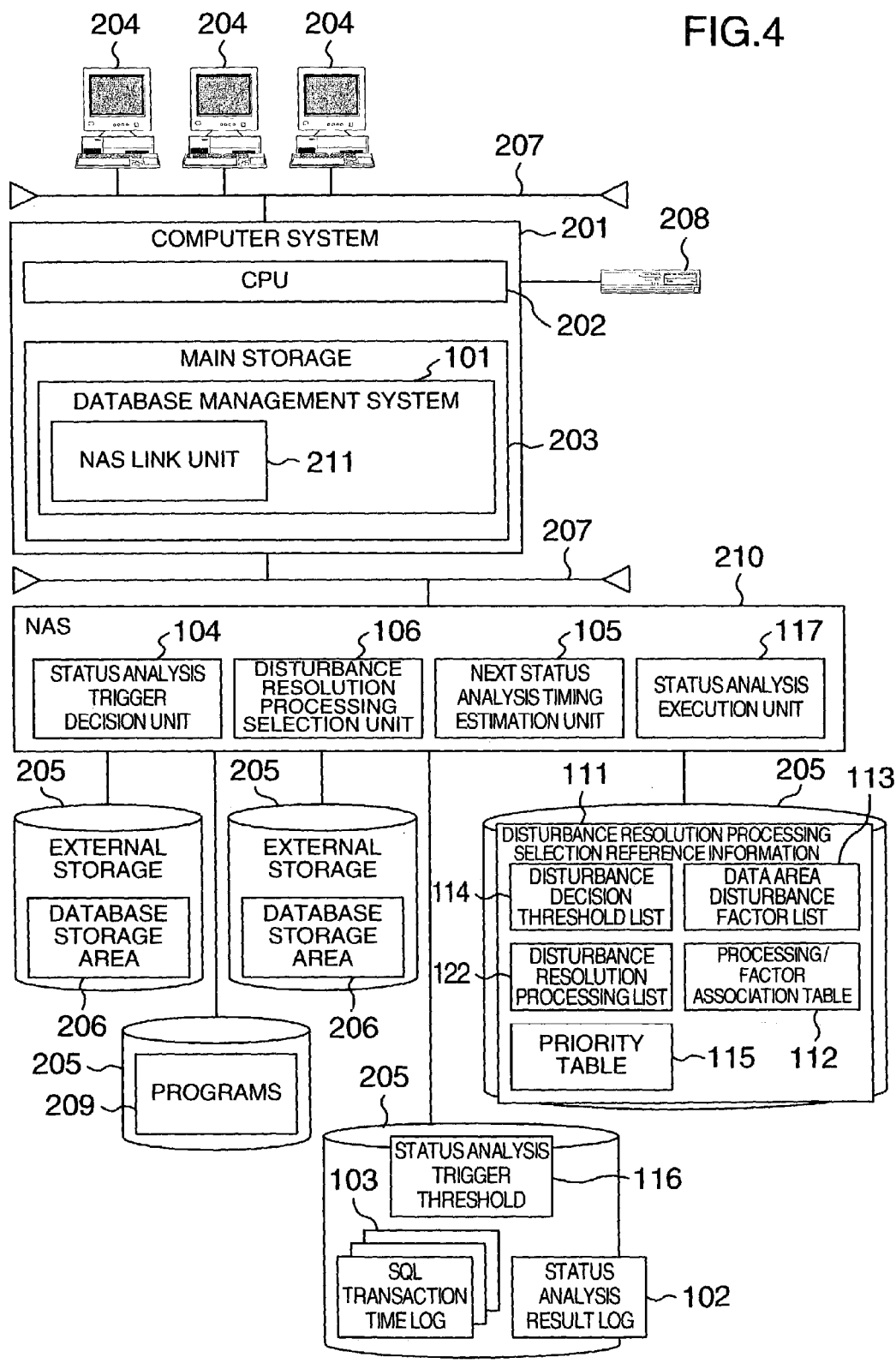

FIG.14

| OPTIMUM PROCESSING: FORWARDED ROW RECLAMATION | | | | | |
|---|---|---|---|---|---|
| | UNUSED SPACE REUSE 1 | EMPTY PAGE RECLAMATION 2 | FORWARDED ROW RECLAMATION 3 | ONLINE REORGANIZATION 4 | REORGANIZATION 5 |
| LOAD | | | | | |
| ACCESS BLOCKING | NOT REQUIRED | NOT REQUIRED | NOT REQUIRED | NOT REQUIRED | REQUIRED |
| REQUIRED DISK CAPACITY | 0 | 0 | 0 | 0 | 0 |
| EXECUTION TIME | MM:SS | MM:SS | MM:SS | MM:SS | MM:SS |
| STORAGE EFFICIENCY (BEFORE/AFTER) | XXXX/XXXX | XXXX/XXXX | XXXX/XXXX | XXXX/XXXX | XXXX/XXXX |
| FORWARDED ROWS (BEFORE/AFTER) | XXXX/XXXX | XXXX/XXXX | XXXX/XXXX | XXXX/XXXX | XXXX/XXXX |
| 0% UTILIZATION (BEFORE/AFTER) | XXXX/XXXX | XXXX/XXXX | XXXX/XXXX | XXXX/XXXX | XXXX/XXXX |

# METHOD AND SYSTEM FOR RESOLVING DISARRANGEMENT IN DATABASE

BACKGROUND OF THE INVENTION

1. Field of the Invention

The present invention relates to a database system for reorganizing a database and more specifically to a technology effectively applicable to a database system that resolves a disturbance of data areas in a round-the-clock operational relational database management system (RDBMS).

2. Description of the Related Art

With rapid advances in e-business and other related areas in recent years, there is a growing need for a round-the-clock operation of database management systems. In a database management system, data stored in the system becomes disarranged or fragmented over time as transactions continue. It is therefore necessary to stop accesses to the database and reorganize the stored data. However, the 24-hour continuous operation does not permit a halt of database access. For this reason, as a substitute means for database reorganization, processing has come to be implemented which eliminates a disturbance of data areas without blocking access to the database.

Such a disturbance resolving method, however, has its limitations and undesired influences. That is, this method is either applicable only to limited kinds of disturbance resolution, such as forwarded row reclamation processing that collects so-called forwarded rows or data stored in a plurality of storage areas, or it imposes a heavy burden on other processing being executed in the database management system. Since single disturbance resolution processing cannot function as a perfect substitute means for database reorganization as described above, some database management systems use multiple kinds of disturbance resolution processing so that appropriate processing can be selected to deal with different situations and purposes. In such systems, it is important to make a correct decision on which of the multiple kinds of disturbance resolution processing should be selected and executed under what circumstance.

As to the conventional single means for reorganization, a method has been disclosed which checks the current state of data areas to see if the database needs to be reorganized and automatically executes reorganization processing as necessary. More specifically, the method involves checking whether there is a data file in excess of allowable size of use and, if so, automatically executing the database reorganization processing (see JP-A-11-161525 (page 5, FIG. 6)).

In a system that has multiple kinds of disturbance resolution processing to deal with different situations and purposes, it is essential to correctly determine which of the multiple disturbance resolution processing should be selected for execution under what circumstance. To make this decision correctly requires a frequent execution of an analysis on the state of database storage areas, which in turn increases a load to be processed. This conventional method, however, provides no satisfactory solution to the increased processing load caused by the status analysis. Further, the conventional method of automatically executing a reorganization does not disclose any means for selecting the optimum from multiple disturbance resolution processing. These problems of the conventional methods still remain to be solved.

SUMMARY OF THE INVENTION

It is therefore an object of the present invention is to solve the problems described above and provide a technique that can minimize a load a status analysis for analyzing a state of database storage areas imposes on the system and which can efficiently select optimum disturbance resolution processing for eliminating a disturbance of the database storage areas.

In a database system that eliminates a disturbance of data storage areas according to the state of use of data areas, the present invention executes a status analysis according to the database transaction cost and selects disturbance resolution processing capable of eliminating the disturbance caused by a disturbance factor detected by the status analysis.

The database system of this invention, when it receives a status analysis command for analyzing the state of the database storage areas, measures an SQL statement transaction time as the current database transaction cost to see if a ratio of the current database transaction cost to the past database transaction cost measured immediately after the execution of the disturbance resolution processing exceeds a threshold as a trigger for executing the status analysis.

If it is found that the ratio is in excess of the threshold, it is decided that it is time to execute the status analysis for analyzing the state of the database storage areas. The status analysis is then executed to output a status analysis result containing values corresponding to disturbance factors such as storage efficiency of the used areas, the number of forwarded rows and the number of pages with 0% utilization.

Next, the system looks up a list of disturbance thresholds used to decide whether each of the disturbance factors has reached a state that requires a disturbance resolution; it then checks if there is any factor in the output status analysis result which exceeds the associated threshold in the list; and it retrieves the factor in excess of the threshold. Then, the system refers to a processing/factor association table to select the disturbance resolution processing capable of eliminating the disturbance caused by the retrieved factor.

As described above, the present invention can select optimum disturbance resolution processing from a plurality of disturbance resolution processing according to the status of use of the data areas and can also reduce a load of status analysis execution by determining an appropriate execution timing of the status analysis.

With the database system of this invention, since the status analysis is executed according to the database transaction cost and appropriate disturbance resolution processing is chosen that can eliminate the disturbance caused by the factor detected by the status analysis, it is possible to minimize the load associated with the execution of the status analysis for analyzing the state of use of the database storage areas and to efficiently select optimum disturbance resolution processing to eliminate the disturbance in the database storage areas.

Other objects, features and advantages of the invention will become apparent from the following description of the embodiments of the invention taken in conjunction with the accompanying drawings.

BRIEF DESCRIPTION OF THE DRAWINGS

FIG. 2 illustrates an example processing/factor association table 112 in Embodiment 1.

FIG. 3 illustrates an example priority table 115 in Embodiment 1.

FIG. 4 illustrates another example of a hardware configuration of the computer system of Embodiment 1.

FIG. 14 is an example display showing conditions for executing disturbance resolution processing and effects produced by the processing in Embodiment 4.

DETAILED DESCRIPTION OF THE EMBODIMENTS

Embodiment 1

A database system as a first embodiment of this invention that eliminates a disturbance of data areas according to the usage of data storage areas will be described in the following.

Figure 1:
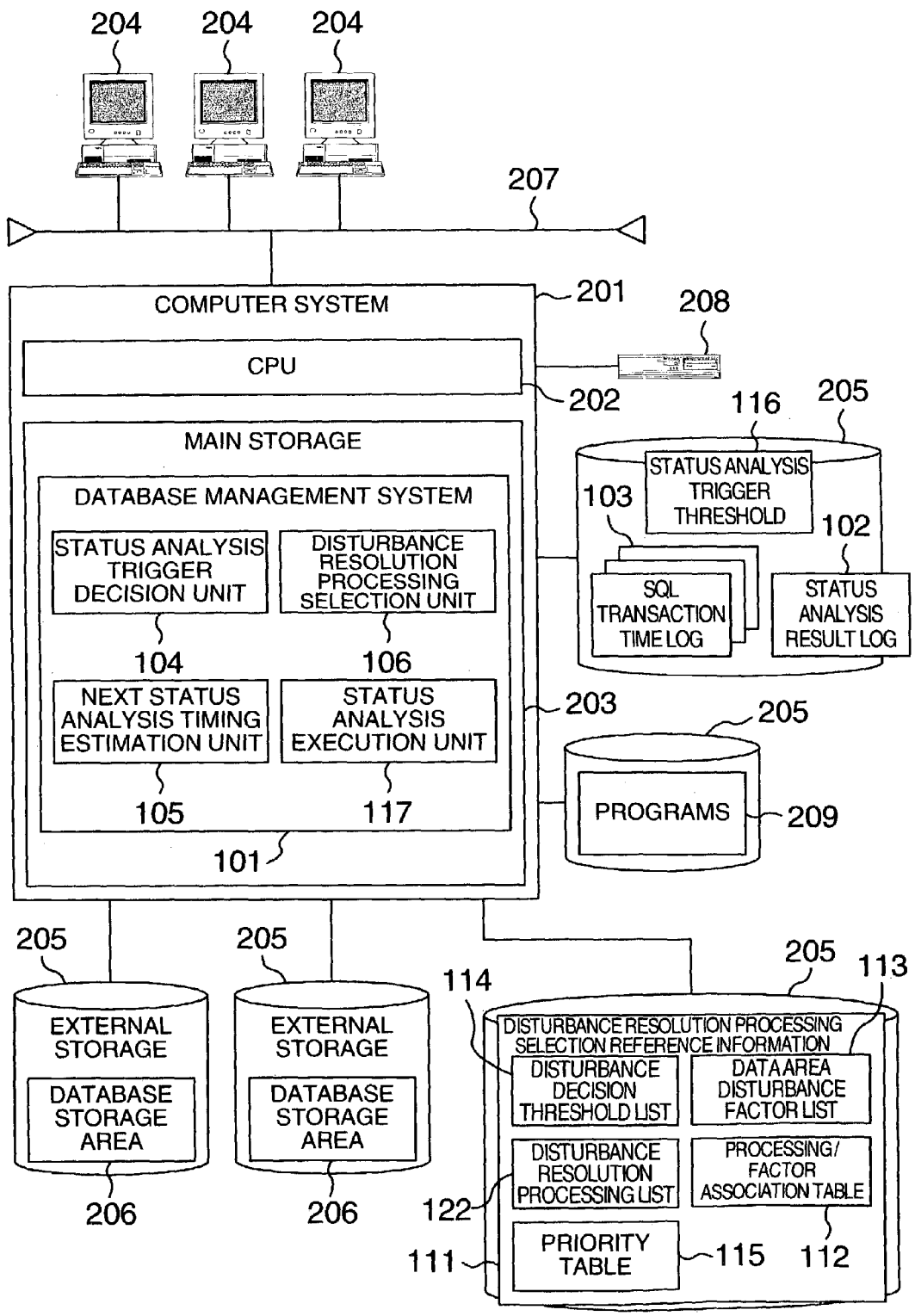
FIG. 1 illustrates an example of a hardware configuration of a computer system of Embodiment 1.

FIG. 1 shows an example hardware configuration of a computer system of this embodiment. As shown in FIG. 1, the computer system 201 of this embodiment has a status analysis trigger decision unit 104, a next status analysis timing estimation unit 105, a disturbance resolution processing selection unit 106, and a status analysis execution unit 117.

The status analysis trigger decision unit 104 measures an SQL statement transaction time as a database transaction cost, calculates a ratio of a current value to a value obtained immediately after the disturbance resolution processing has been executed, and, if the ratio exceeds a status analysis trigger threshold 116 representing a trigger for executing the status analysis, decides that it is time to execute the status analysis.

If the ratio is not in excess of the status analysis trigger threshold 116, the next status analysis timing estimation unit 105 estimates the next status analysis execution timing from an SQL transaction time log 103 representing a log of database transaction costs or from a status analysis result log 102 representing a log of status analysis results.

The disturbance resolution processing selection unit 106 looks up a disturbance decision threshold list 114 containing thresholds used to determine whether disturbance factors have reached states that require disturbance resolutions, retrieves a disturbance factor in the output status analysis result that exceeds the associated threshold in the list 114, refers to an association table 112 that associates disturbance resolution processing with factors causing disturbance to be resolved by the processing, and selects the disturbance resolution processing that can resolve the disturbance caused by the retrieved factor. The status analysis execution unit 117, when it is decided the time has come to execute the status analysis, analyzes the state of the database storage areas 206 and outputs as the status analysis result values corresponding to the respective disturbance factors.

A program, which causes the computer system 201 to function as the status analysis trigger decision unit 104, the next status analysis timing estimation unit 105, the disturbance resolution processing selection unit 106 and the status analysis execution unit 117, is recorded in a recording medium such as CD-ROM and then stored in a magnetic disk, from which it is loaded into memory for execution. The recording medium for recording the program may be other than the CD-ROM. The program may also be installed from the recording medium into an information processing apparatus or used by accessing the medium via network.

The computer system 201 includes a CPU 202, a main storage 203, external storages 205 such as magnetic disk drives, and a floppy disk drive 208 and is connected to a number of terminals 204 through a network 207. On the main storage 203 is placed a database management system 101. On the external storages 205 are placed database storage areas 206 in which a database managed by the database management system 101 is stored. Further, a program 209 for implementing the database management system 101, and an SQL transaction time log 103, disturbance resolution processing selection reference information 111 and a status analysis trigger threshold 116, all used by the program 209, are placed on the external storages 205. The terminals 204 can operate the database management system 101 through the network 207 as by entering a status analysis command and retrieving information. Data can be transferred to and from a medium in the floppy disk drive 208.

The disturbance resolution processing selection reference information 111 comprises the following:

Data area disturbance factor list 113
Disturbance decision threshold list 114
Disturbance resolution processing list 122
Priority table 115
Processing/factor association table 112

The data area disturbance factor list 113 lists factors causing a disturbance of data areas and in this embodiment comprises the following three:

A storage efficiency of used areas: a ratio of areas in which data is actually stored to the capacity of database storage areas 206 secured for use by the database management system 101

The number of forwarded rows: the number of those of the rows making up the database which are stored in multiple areas (pages) secured by the database management system 101

The number of areas (pages) with 0% utilization: the number of those of the pages secured by the database management system 101 which contain no rows at all.

The disturbance decision threshold list 114 contains thresholds used to determine if the data areas are highly disarranged. The thresholds for disturbance factors are preset with default values but can be defined by a system administrator.

The disturbance resolution processing list 122 contains processing capable of eliminating the disturbance of storage areas and comprises the following five:

- Reorganization (301): This processing involves stopping access to the database, retrieving stored data and restoring them to rearrange the data in order. This can completely eliminate the storage area disturbance but requires another storage area equal to or larger in capacity than the stored data and a stoppage of access to the database.
- Online Reorganization (302): This processing copies stored data into another area in the database to rearrange them in order and, after copying, switches the database to the rearranged database. This can completely eliminate the storage area disturbance but requires another storage area of a capacity equal to or larger than that of the stored data, imposing a heavy load on the database management system 101 and taking longer to complete than the Reorganization processing.
- Unused Space Reuse (305): This processing gives priority to making efficient use of unused spaces in the secured areas when securing storage areas. Although the load on the database management system 101 is small, the forwarded rows are not reclaimed because data is not actually moved.
- Empty Page Reclamation (304): This processing reclaims pages with 0% utilization for reuse. Although the load on the database management system 101 is small, this processing is not effective for other than 0% utilization pages.
- Forwarded Row Reclamation (303): This processing collects and integrates forwarded rows and takes a shorter time to execute but is not effective for other than forwarded rows.

The priority table 115 shows levels of priority in selecting appropriate disturbance resolution processing for the detected state of storage areas. The smaller the load which the processing imposes on the database management system 101, the higher the priority level assigned to the processing will be. Further, the priority table 115 also classifies the processing into those that require locking access to the database and those that do not. The processing/factor association table 112 used here is shown in FIG. 2, and the priority table 115 is shown in FIG. 3.

FIG. 2 shows an example of the table indicating associations between disturbance resolution processing and factors causing disturbance to be solved by the associated processing in this embodiment. As shown in FIG. 2, the processing/factor association table 112 comprises rows of the disturbance resolution processing taken from the list 122 and columns of the data area disturbance factors taken from the list 113. The columns of those disturbance factors that can be resolved by the associated processing are assigned a symbol "O" and the columns of those that cannot be resolved are assigned a symbol "X".

FIG. 3 shows an example of the priority table 115 in this embodiment. The table 115 comprises: rows of the disturbance resolution processing taken from the list 122; a column indicating whether the blocking of access to the database is required or not when executing the associated disturbance resolution processing; and a column indicating magnitudes of load that the associated processing when executed imposes on the operation of other processing of the database management system 101. This column also shows that entries of the resolution processing rows are arranged in the order of increasing load.

The SQL transaction time log 103 indicates measured transaction times that SQL statements specified by an administrator take to execute. The status analysis trigger threshold 116 has a threshold value for activating the status analysis execution unit 117 based on how much more time it takes to execute the SQL statement than when, immediately after the resolution processing has been executed, the stored data areas are not disarranged at all. The threshold value is preset with a default value but may be defined by a system administrator.

FIG. 4 shows another example of hardware configuration of the computer system of this embodiment. In this example, the external storages 205 are all managed by a NAS (network attached storage) 210, which executes those processing that in the first configuration are executed in the database management system 101, i.e., the processing of the status analysis trigger decision unit 104, the next status analysis timing estimation unit 105, the disturbance resolution processing selection unit 106 and the status analysis execution unit 117. This second configuration requires a NAS link unit 211 to establish a link between the database management system 101 and the NAS 210.

Now, in the database system of this embodiment, processing will be described which involves calculating a ratio of SQL statement transaction times, deciding whether it is time to execute the status analysis, executing the status analysis according to the result of decision, and selecting appropriate disturbance resolution processing.

Figure 5:
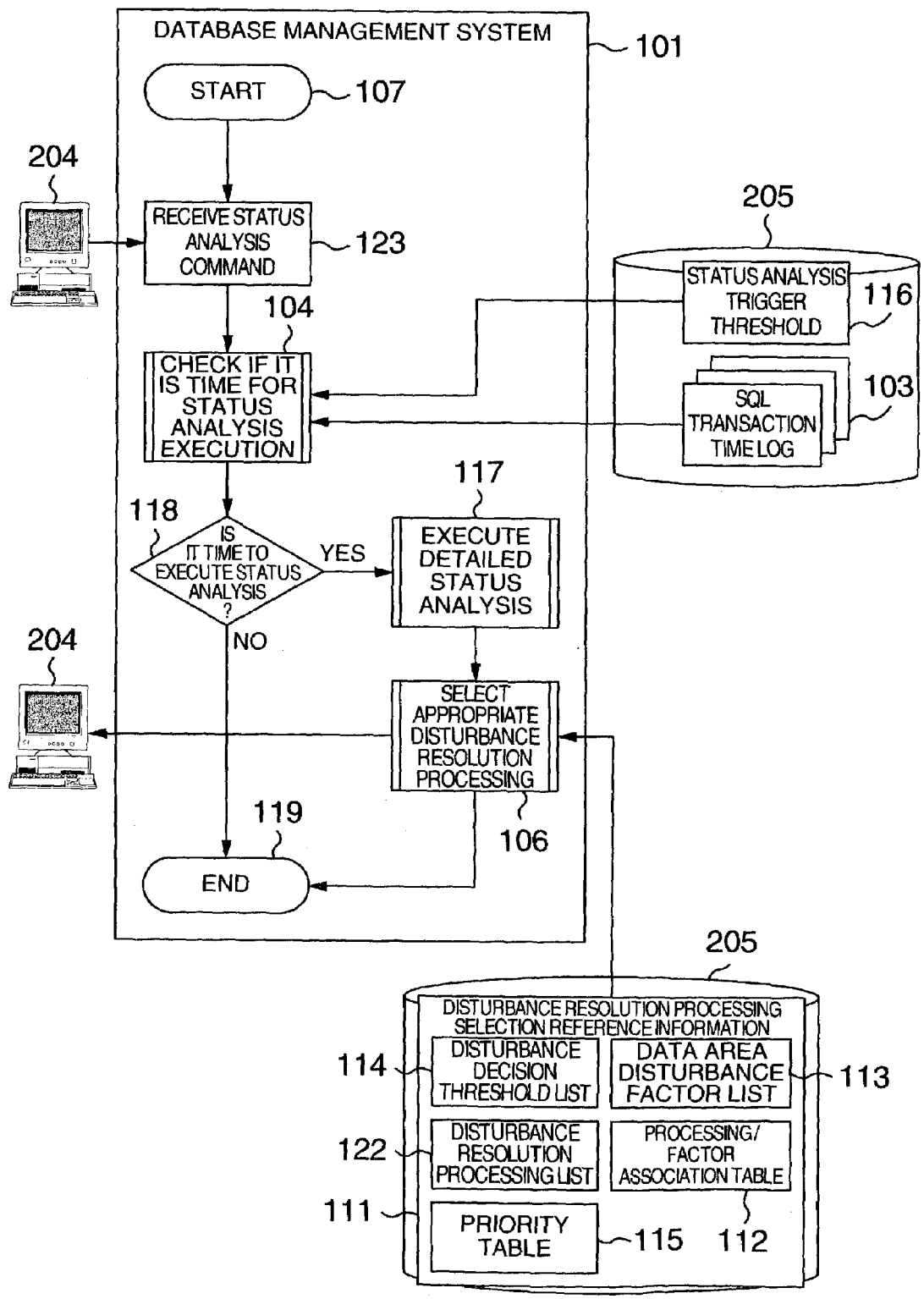
FIG. 5 is a flow chart showing a series of steps performed by whole database disturbance resolution processing of Embodiment 1.

FIG. 5 is a flow chart showing a series of steps performed by the whole database disturbance resolution processing of this embodiment. As shown in FIG. 5, at step 123 the database management system 101 checks if a status analysis command requesting the execution of the status analysis is entered from the terminal 204. If it is found that the status analysis command is entered, the system moves to step 104.

At step 104 the database management system 101 starts the status analysis trigger decision unit 104 to calculate a ratio of SQL statement transaction times to decide whether it is time to perform the status analysis.

At step 118 the result of the above decision is checked to see if it is time to perform the status analysis and, if so, step 117 activates the status analysis execution unit 117 to execute the status analysis. Then, at step 106 the disturbance resolution processing selection unit 106 selects appropriate disturbance resolution processing by using the disturbance resolution processing selection reference information 111. If at step 118 the check on the decision result shows that it is not time to execute the status analysis, the processing is ended.

Figure 6:
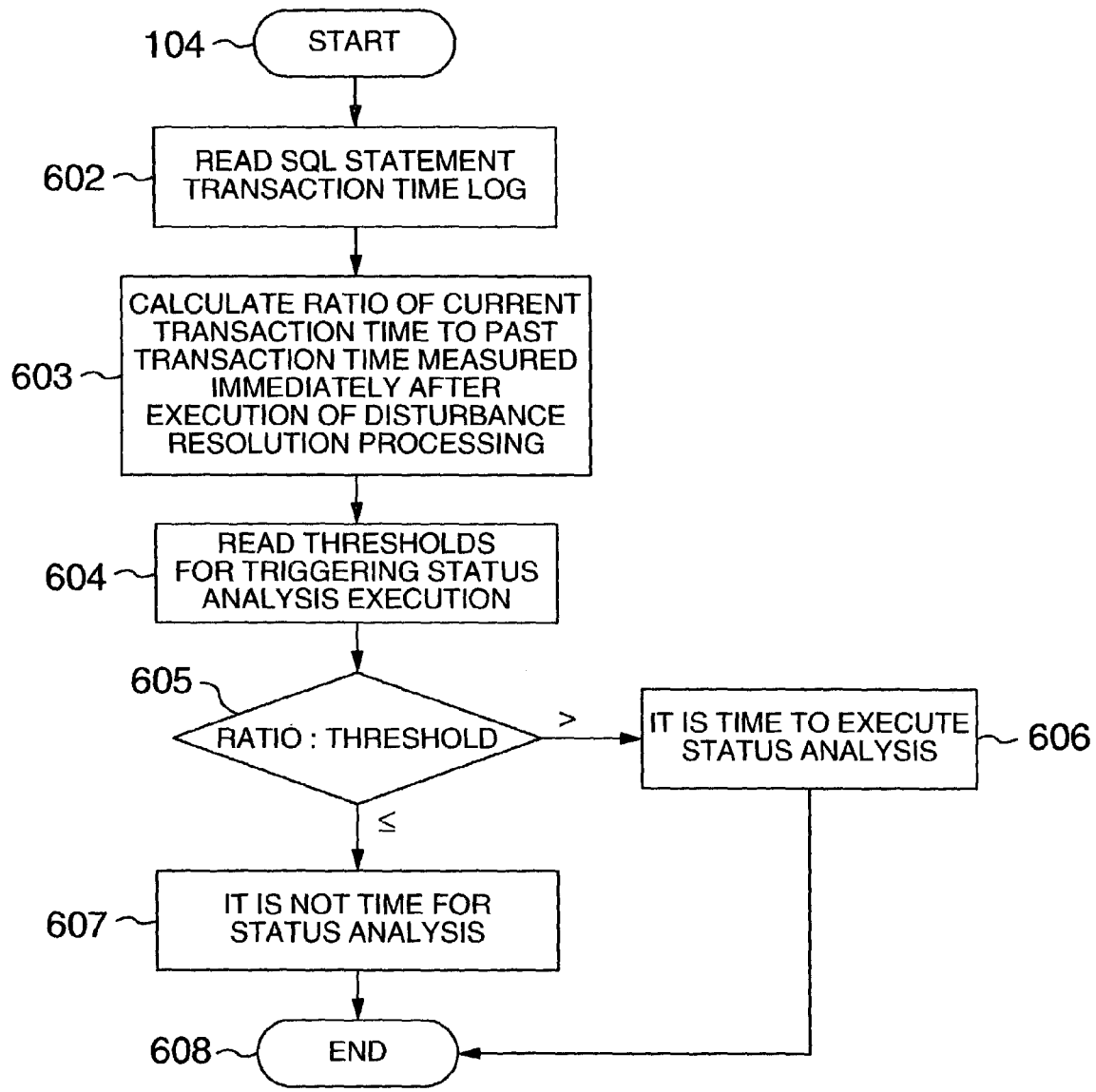
FIG. 6 is a flow chart showing a series of steps performed by a status analysis trigger decision unit 104 in Embodiment 1.

FIG. 6 shows a flow chart showing a series of steps performed by the status analysis trigger decision unit 104 in this embodiment. As shown in FIG. 6, at step 602 the status analysis trigger decision unit 104 reads the SQL transaction time log 103 including information on the SQL statement transaction times measured in the past and, at step 603, measures the current SQL statement transaction time and calculates a ratio of the current SQL statement transaction time to a past SQL statement transaction time measured immediately after a disturbance resolution processing was executed.

Then at step 604, the unit 104 reads the status analysis trigger threshold 116. At step 605, the unit 104 compares the calculated ratio of the SQL statement transaction times with the status analysis trigger threshold 116 just read in. If the ratio is greater than the threshold, the unit moves to step 606 and decides that now is the time to execute the status analysis. If at step 605 it is found that the ratio is not greater than the threshold, the unit moves to step 607 where it decides that it is not time to execute the status analysis.

Suppose, for example, that as a result of calculating the ratio of the current SQL statement transaction time to the past SQL statement transaction time measured immediately after the disturbance resolution processing was executed, the ratio is 1.5, i.e., the current SQL statement transaction time is 1.5 times the past SQL statement transaction time measured when there was no disturbance immediately after the execution of the disturbance resolution processing. Also suppose the status analysis trigger threshold 116 is defined to be "1.4" as the SQL statement transaction time ratio. Then, it is determined that it is time to execute the status analysis.

Figure 7:
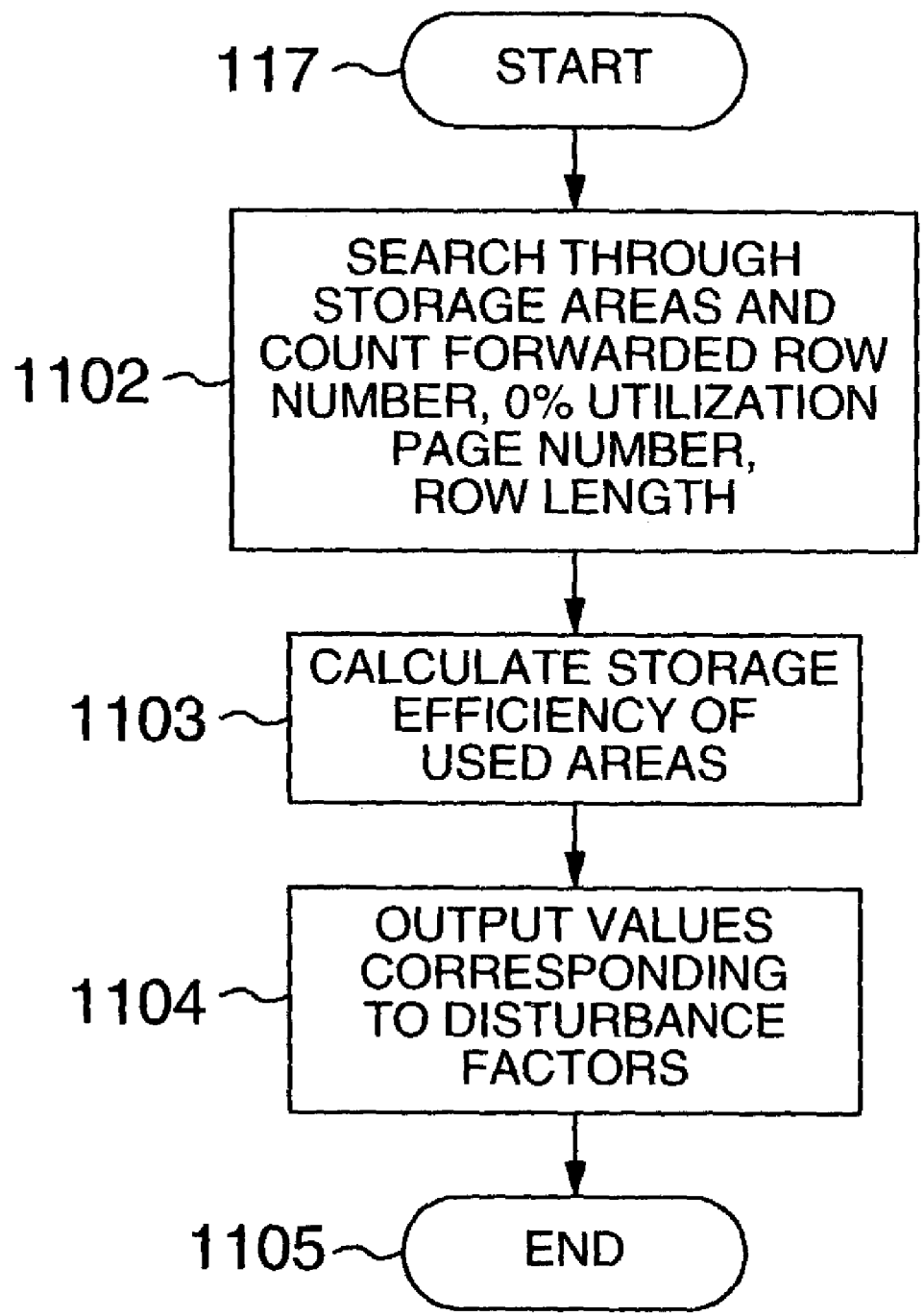
FIG. 7 is a flow chart showing a series of steps performed by a status analysis execution unit 117 in Embodiment 1.

FIG. 7 is a flow chart showing a series of steps performed by the status analysis execution unit 117. As shown in FIG. 7, the status analysis execution unit 117 at step 1102 searches through the database storage areas 206 secured for use by the database management system 101 to count the number of forwarded rows, the number of pages with 0% utilization and the length of rows.

At step 1103 the unit 117 calculates a ratio of the size of actual data-stored areas to the capacity of the database storage areas 206 secured by the database management system 101 to determine a storage efficiency of the areas being used.

At step 1104 the unit 117 outputs, as the result of status analysis, values corresponding to the respective disturbance factors that are storage efficiency of areas used, the number of forwarded rows and the number of pages with 0% utilization.

Figure 8:
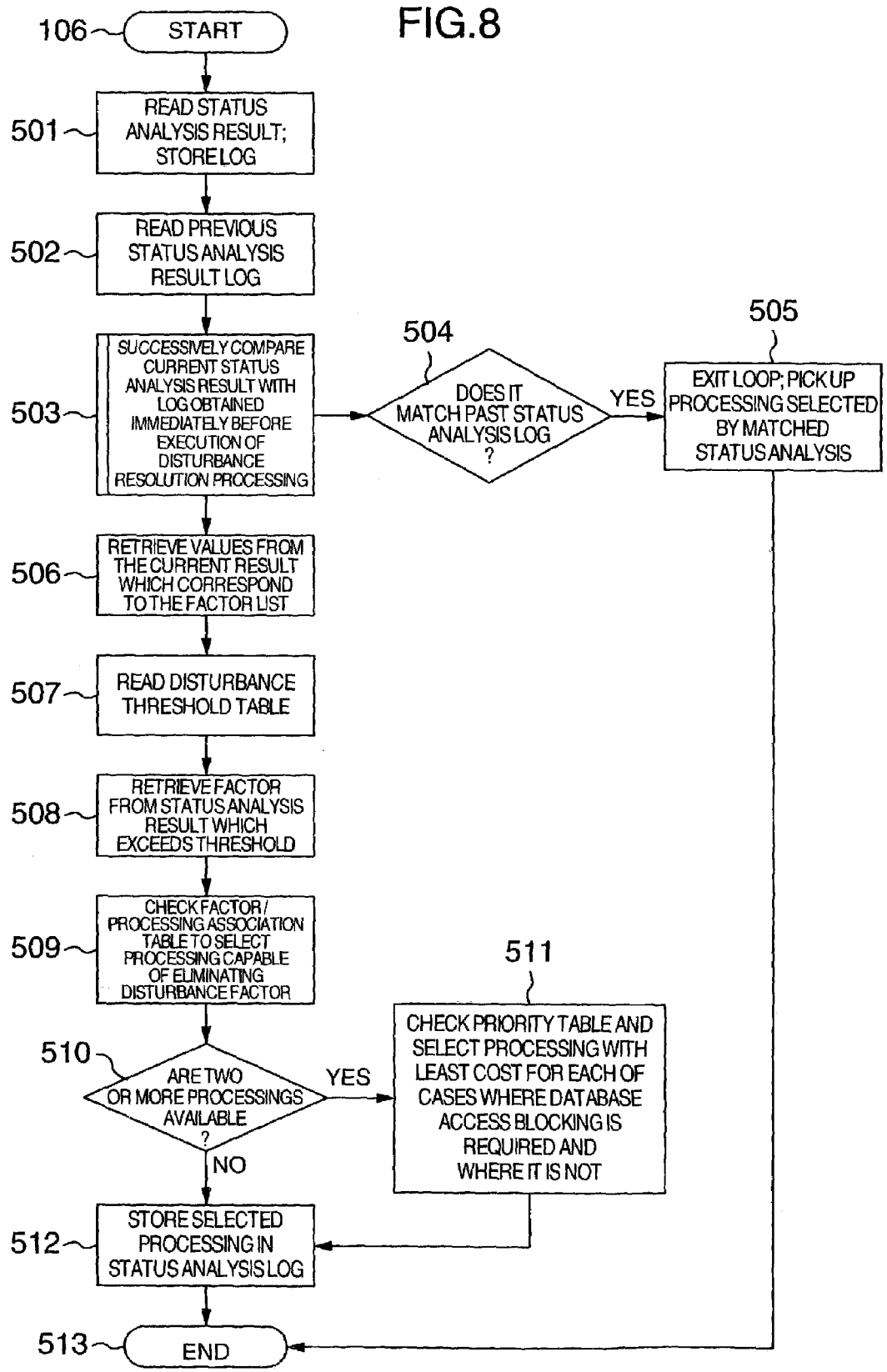
FIG. 8 is a flow chart showing a series of steps performed by a disturbance resolution processing selection unit 106 in Embodiment 1.

FIG. 8 is a flow chart showing a series of steps performed by the disturbance resolution processing selection unit 106 in this embodiment. At step 501, the disturbance resolution processing selection unit 106 reads the result of status analysis output from the status analysis execution unit 117 and adds it to the status analysis result log 102 containing previous status analysis results. Then, at step 502 the unit 106 reads the previous status analysis results from the status analysis result log 102.

At step 503 the unit 106 successively compares the current status analysis result read in step 501 with the previous status analysis results read in step 502 to check if there is any previous status analysis result whose values of the respective disturbance factors agree with those of the current status analysis results. If the current status analysis result agrees with a previous status analysis result, the unit 106 moves from step 504 to step 505 where it selects the disturbance resolution processing, which was chosen by the previous status analysis result that matches the current status analysis result, as the disturbance resolution processing for the current status analysis result. Here, it is assumed that the information representing the disturbance resolution processing selected by the previous status analysis result is stored in the status analysis result log 102 along with the values of the previous status analysis result.

If the current status analysis result does not agree with any of the previous status analysis results, the unit 106 moves to step 506 where it retrieves those of the values of the current status analysis result which correspond to the three items in the data area disturbance factor list 113.

At step 507 the unit 106 reads the disturbance decision threshold list 114 and at step 508 compares the values of the current status analysis result retrieved by step 506 with thresholds in the disturbance decision threshold list 114 read in by step 507 and picks up, from among the disturbance factors whose values were retrieved by step 506, those factors whose values exceed the thresholds in the disturbance decision threshold list 114.

At step 509 the unit 106 refers to the processing/factor association table 112 to select disturbance resolution processing from the table 112 that can eliminate the disturbance caused by the factors whose values were found to exceed the thresholds in step 508.

At step 510 the unit 106 checks if a plurality of processing have been picked up and, if so, proceeds to step 511 where it looks up the priority table 115, selects processing having the least load from among the processing picked up by step 509 in each of cases where the blocking of database access is permitted and where it is not permitted. Then at step 512 the selected processing are stored in the status analysis result log 102 and the disturbance resolution processing selection procedure is ended.

If the number of processing selected at step 509 is not more than one, the unit 106 moves from step 510 to step 512 where it stores the processing selected by step 509 in the status analysis result log 102. Now, the disturbance resolution processing selection procedure is ended.

Take, for example, a case where the status analysis finds that only the number of forwarded rows exceeds the threshold in the disturbance decision threshold list 114. In the processing/factor association table 112 of FIG. 2, processing marked with "O" in the "forwarded rows" item are read out to narrow the processing capable of eliminating the disturbance caused by this "forwarded rows" factor down to three, i.e., "Reorganization", "Online Reorganization" and "Forwarded Rows Reclamation". In the priority table 115 of FIG. 3, of these three processing, the "Online Reorganization" and "Forwarded Rows Reclamation" are both specified as "not required" in the "access blocking" item. Of these two processing, the "Forwarded Rows Reclamation" with a smaller load in the "load" item is chosen. Then, the "Forwarded Rows Reclamation" is selected as the disturbance resolution processing for a situation where the blocking of access to the database is not permitted, and the "Reorganization" is selected as the disturbance resolution processing for a situation where the access blocking is permitted.

As described above, with this embodiment, it is possible to select appropriate processing from a plurality of disturbance resolution processing according to the state of database storage areas and also to reduce, by the status analysis trigger decision function, a load which the execution of the status analysis imposes on the system.

As described above, the database system of this embodiment executes the status analysis according to the database transaction cost and, based on the result of the status analysis, selects processing that can eliminate the disturbance caused by the detected disturbance factor. Therefore, a load which the execution of the status analysis on the state of database storage areas will impose on the system can be minimized and at the same time appropriate processing for eliminating the disturbance of the database storage areas can be efficiently selected.

Embodiment 2

A database system of a second embodiment for estimating the next status analysis execution timing using an SQL transaction time log will be described.

When during its processing in Embodiment 1 the status analysis trigger decision unit 104 decides that the time has not yet come to execute the status analysis, the next status analysis timing estimation unit 105 of Embodiment 2 estimates the next status analysis execution timing by using the SQL transaction time log 103. Overall processing performed by this embodiment is shown in FIG. 9 and an outline flow of the processing performed by the next status analysis timing estimation unit 105 is shown in FIG. 10.

Figure 9:
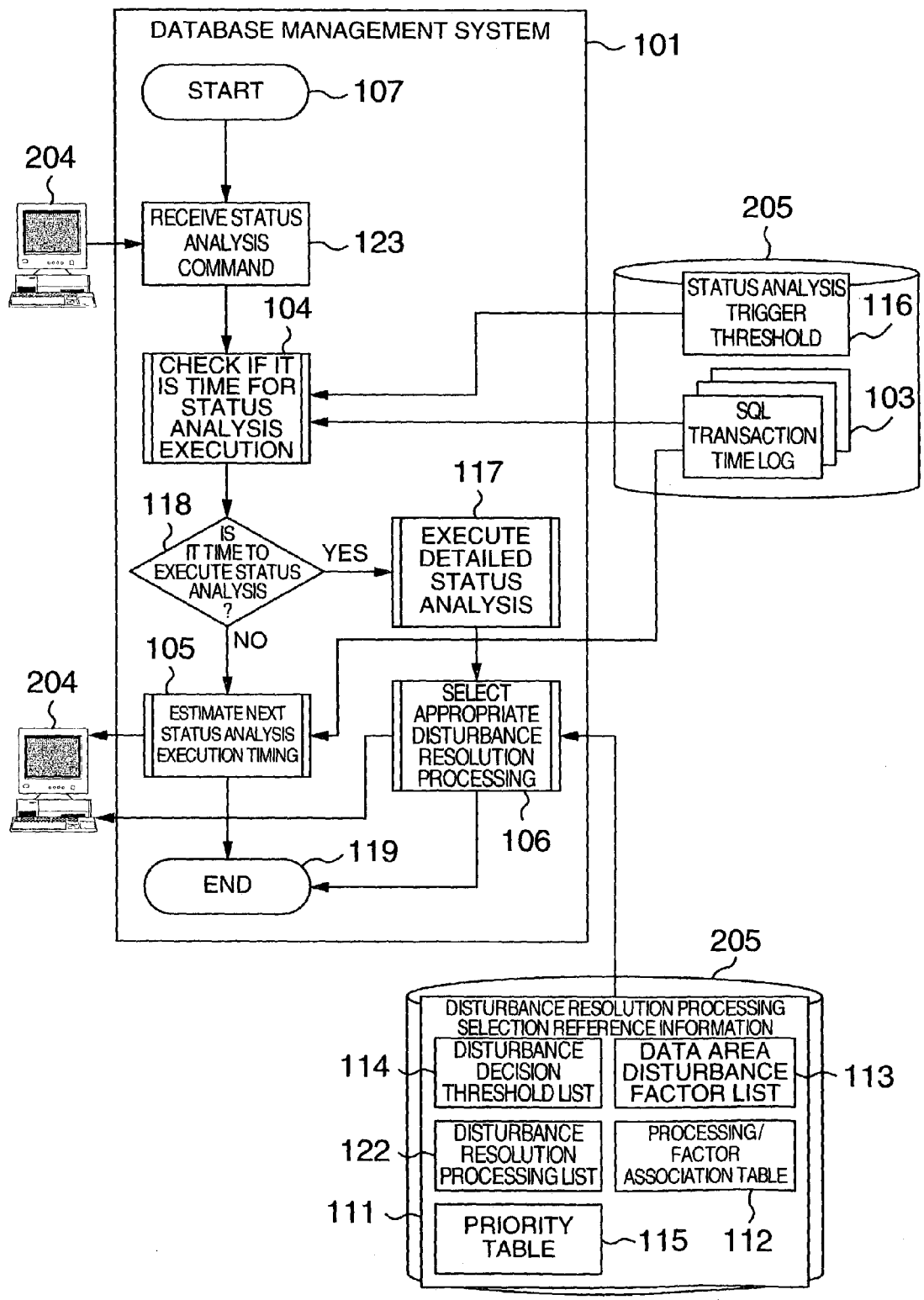
FIG. 9 is a flow chart showing a series of steps performed by whole database disturbance resolution processing of Embodiment 2.
Figure 10:
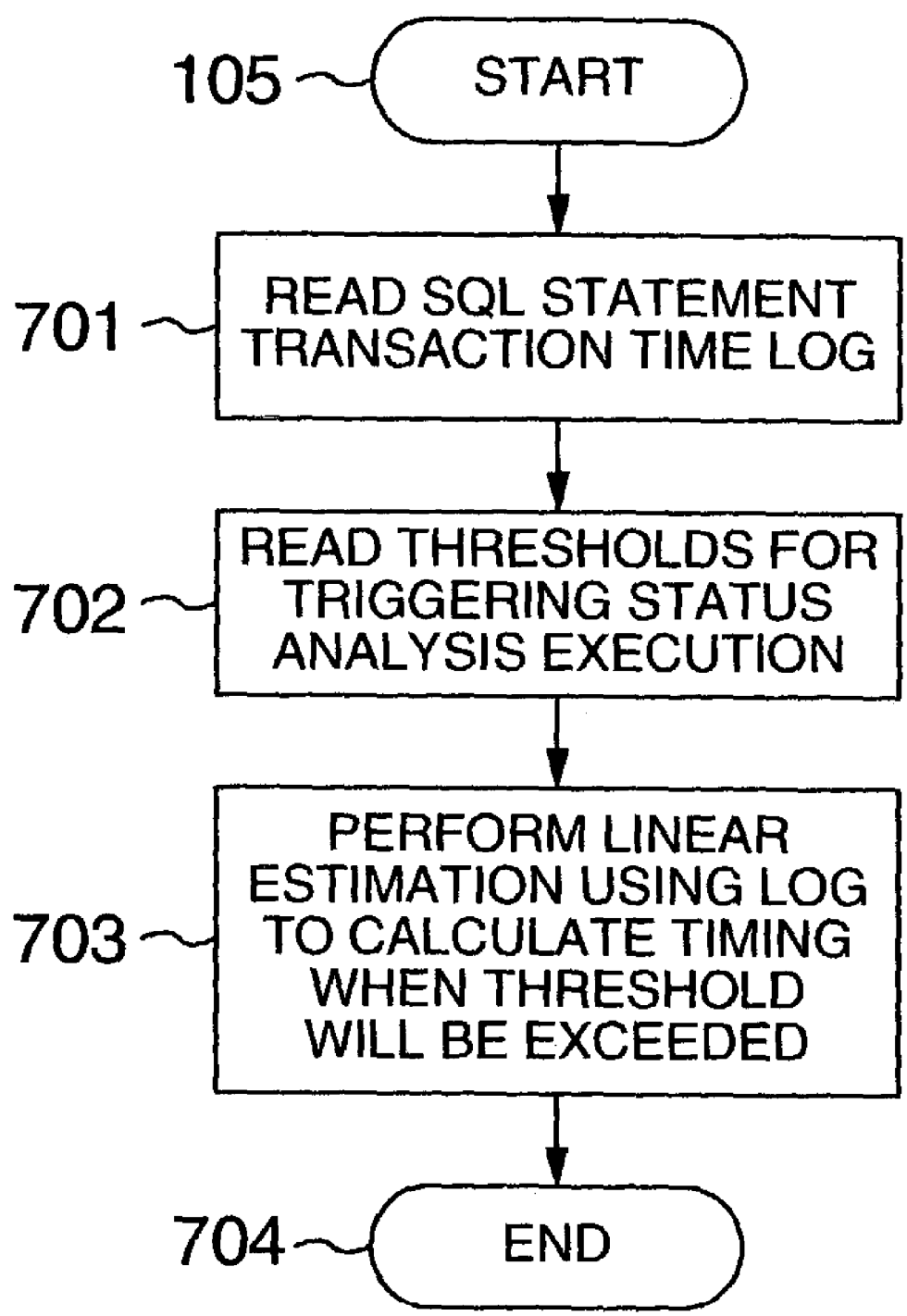
FIG. 10 is a flow chart showing a series of steps performed by a next status analysis timing estimation unit 105 in Embodiment 2.

FIG. 9 is a flow chart showing a series of steps performed by the whole database disturbance resolution processing of this embodiment. As shown in FIG. 9, at step 123 the database management system 101 of this embodiment checks whether a status analysis command requesting the execution of the status analysis is entered from the terminal 204. If the status analysis command is found, the system moves to step 104.

At step 104, the database management system 101 starts the status analysis trigger decision unit 104 to calculate a ratio of SQL statement transaction times to decide whether it is time to perform the status analysis.

At step 118 the result of the above decision is checked to see if it is time to perform the status analysis and, if so, step 117 activates the status analysis execution unit 117 to execute the status analysis. Then, at step 106 the disturbance resolution processing selection unit 106 selects appropriate disturbance resolution processing by using the disturbance resolution processing selection reference information 111.

If at step 118 the check on the decision result finds that it is not time to execute the status analysis, the system moves to step 105. At step 105, the next status analysis timing estimation unit 105 estimates the next status analysis execution timing by using information in the SQL transaction time log 103 representing a log of database transaction costs and displays the estimated timing to the terminal 204.

FIG. 10 is a flow chart showing a series of steps performed by the next status analysis timing estimation unit 105 of this embodiment. At step 701 the next status analysis timing estimation unit 105 reads the SQL transaction time log 103 containing information on the SQL statement transaction times measured in the past and, at step 702, also reads the status analysis trigger threshold 116.

At step 703, the unit 105 makes an estimation, assuming that the SQL statement transaction time will increase linearly. That is, it reads out data of SQL statement transaction times recorded after the previous disturbance resolution processing was executed, and makes a linear estimation using the data thus read out to calculate a timing when the SQL statement transaction time will exceed the status analysis trigger threshold 116. The unit 105 then displays the estimated result to the terminal 204. The estimation may also be made according to quadratic or other functions.

In this embodiment, as described above, the estimation of an appropriate status analysis execution timing can reduce the number of times that the status analysis command needs to be entered from the terminal 204 and also reduce a load that the measurement of the SQL statement transaction times imposes on the system.

Embodiment 3

A third embodiment of the database system that estimates the next status analysis execution timing by using the status analysis result log will be described.

The next status analysis timing estimation unit 105 of this embodiment uses the stored status analysis result log 102 rather than the SQL transaction time log 103 as it does in Embodiment 2. Overall processing performed by this embodiment is shown in FIG. 11 and an outline flow of the processing performed by the next status analysis timing estimation unit 105 is shown in FIG. 12.

Figure 11:
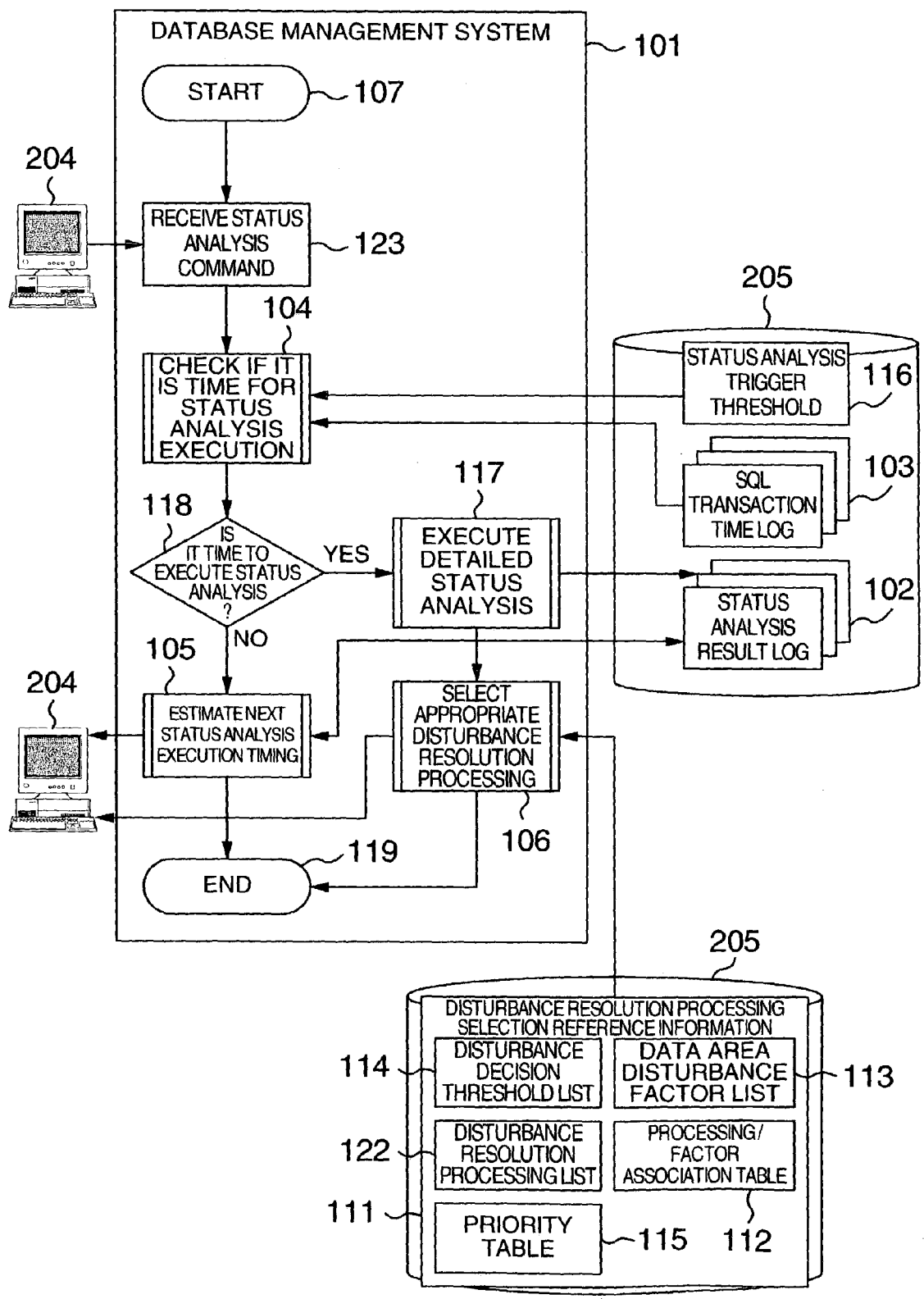
FIG. 11 is a flow chart showing a series of steps performed by whole database disturbance resolution processing of Embodiment 3.
Figure 12:
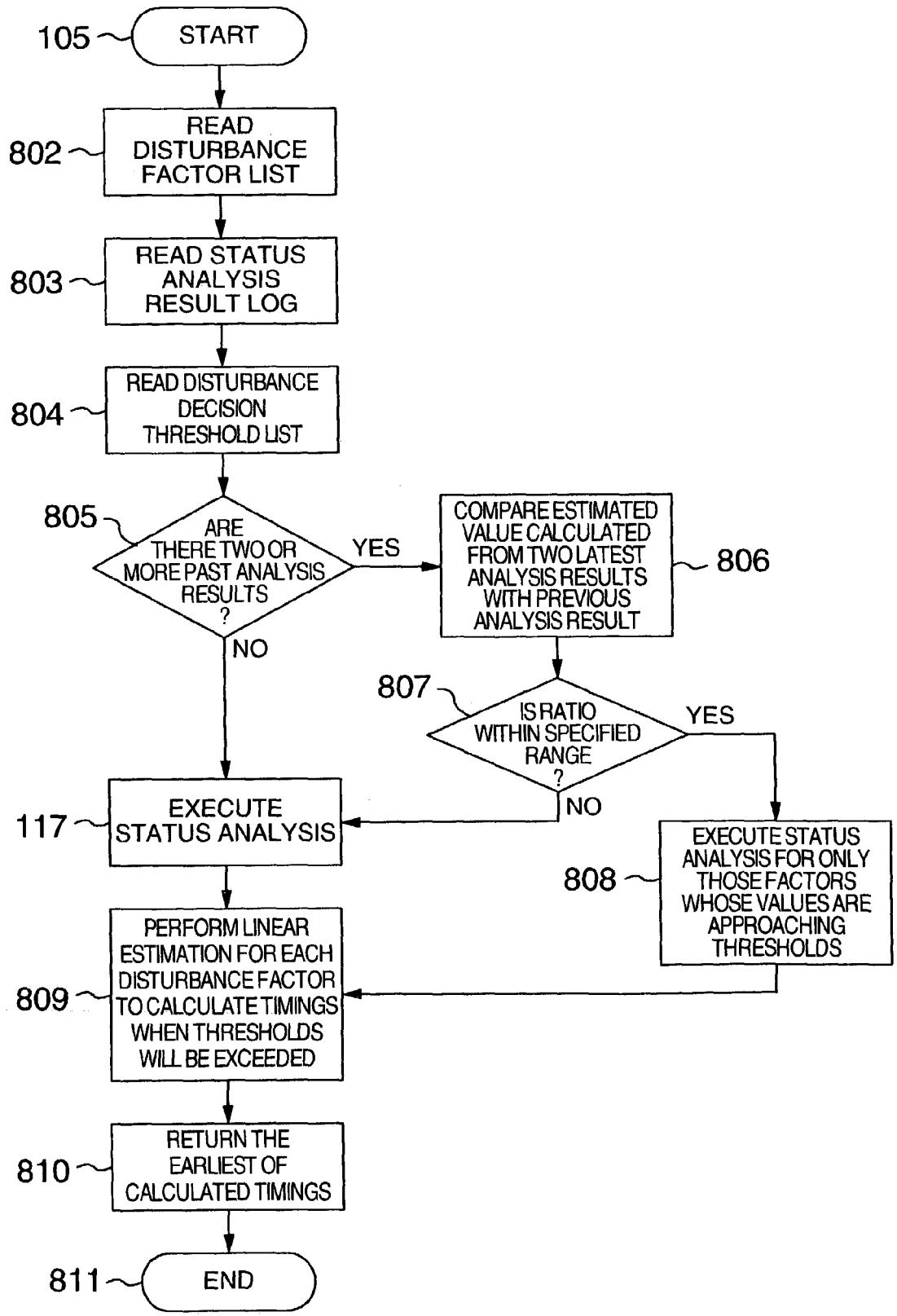
FIG. 12 is a flow chart showing a series of steps performed by a next status analysis timing estimation unit 105 in Embodiment 3.

FIG. 11 is a flow chart showing a series of steps performed by the whole database disturbance resolution processing of this embodiment. As shown in FIG. 11, at step 123 the database management system 101 of this embodiment checks whether a status analysis command requesting the execution of the status analysis is entered from the terminal 204. If the status analysis command is found, the system moves to step 104.

At step 104, the database management system 101 starts the status analysis trigger decision unit 104 to calculate a ratio of SQL statement transaction times to decide whether it is time to perform the status analysis.

At step 118 the result of the above decision is checked to see if it is time to perform the status analysis and, if so, step 117 activates the status analysis execution unit 117 to execute the status analysis. Then, at step 106 the disturbance resolution processing selection unit 106 selects appropriate disturbance resolution processing by using the disturbance resolution processing selection reference information 111.

If at step 118 the check on the decision result finds that it is not time to execute the status analysis, the system moves to step 105. At step 105, the next status analysis timing estimation unit 105 estimates the next status analysis execution timing by using information in the status analysis result log 102 representing previous status analysis results and displays the estimated timing to the terminal 204.

FIG. 12 is a flow chart showing a series of steps performed by the next status analysis timing estimation unit 105 of this embodiment. At step 802 the next status analysis timing estimation unit 105 reads the data area disturbance factor list 113, and at step 803 reads values corresponding to the factor in the disturbance factor list from the status analysis result log 102 representing the previous status analysis results. At step 804, the unit 105 reads the disturbance decision threshold list 114.

At step 805 the unit 105 checks whether the status analysis result log has two or more past analysis results obtained after the previous disturbance resolution processing was executed and, if so, proceeds to step 806. At step 806 it performs a linear estimation using two or more past analysis results to calculate an estimated value at the time of the previous status analysis, and calculates a ratio of the estimated value to an actual value produced by the previous status analysis.

At step 807 the unit 105 checks if the calculated ratio is within a range specified by the database management system 101 and, if so, decides that the state is progressing as expected with no large variations, and then moves to step 808 where it executes the status analysis for only those items whose values are approaching their thresholds.

If step 807 decides that the calculated ratio is out of the specified range, the unit 105 proceeds to step 117 where it executes the normal status analysis. The normal status analysis is also executed if step 805 finds that there are not two or more past status analysis results in the status analysis result log 102.

At step 809 the unit 105 performs a linear estimation on transition of the values of the respective disturbance factors to estimate timings when the thresholds in the disturbance decision threshold list 114 will be exceeded. The estimation may also be made using quadratic or other functions. At step 810, the earliest of the estimated timings when the thresholds will be exceeded is taken to be the next status analysis execution timing, which is displayed to the terminal 204.

Figure 13:
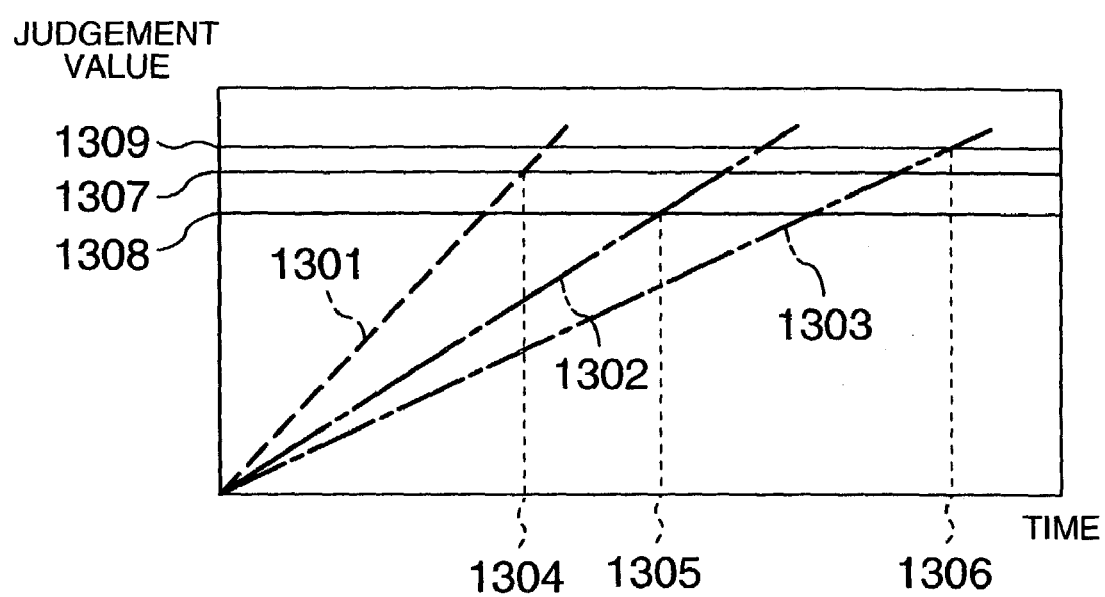
FIG. 13 is a diagram showing an example of linear estimation method performed by step 809 and step 810 in Embodiment 3.

FIG. 13 shows an example linear estimation method performed at step 809 and step 810 in this embodiment. As shown in FIG. 13, a linear estimation is made of a possible reduction in storage efficiency from the past status analysis result log (for example, a linear estimation 1301). Then, a disturbance resolution execution timing 1304 at which the deteriorating storage efficiency will exceed a threshold 1307 is calculated. The example linear estimation shown in FIG. 13 represents an estimated change in the storage efficiency.

Also for the number of forwarded rows and the number of pages with 0% utilization, the estimated timings of disturbance resolution execution 1305, 1306 are calculated. The earliest of the three estimated disturbance resolution execution timings 1304-1306, namely the timing 1304, is taken to be the next status analysis execution timing.

As described above, this embodiment estimates an appropriate status analysis trigger timing more precisely than Embodiment 2 and thereby can reduce the number of times that the status analysis is executed and the load the status analysis execution imposes on the system.

Embodiment 4

A fourth embodiment of the database system will be described which outputs a condition for executing the disturbance resolution processing and effects produced by the processing.

When the disturbance resolution processing selection unit 106 of Embodiment 1 performs processing and presents the result, Embodiment 4 has the unit 106 also output, for other than the selected processing, the condition for executing the disturbance resolution processing and the effects produced by the processing.

FIG. 14 shows an example display of conditions for executing disturbance resolution processing and effects produced by the associated processing in this embodiment. As shown in FIG. 14, "Load", "Access Blocking", "Required Disk Capacity" and "Execution Time" are items displayed as the conditions for executing the disturbance resolution processing. These information are prepared in advance in the database management system 101.

Load: An item representing the priority level of each disturbance resolution processing according to the magnitude of load imposed on the database management system 101

Access Blocking: An item indicating whether or not database accesses need to be blocked when executing the associated disturbance resolution processing Required Disk Capacity: An item representing a disk capacity required in addition to the storage areas currently being used when executing the associated disturbance resolution processing Execution Time: An item indicating a length of time required to execute the associated disturbance resolution processing As the effects produced by the disturbance resolution processing, the values of respective disturbance factors before and after the execution of the associated processing are displayed.

As described above, since this embodiment presents information for use in selecting appropriate disturbance resolution processing, it has an advantage of widening a range of alternatives for an administrator of the database management system 101 to determine which disturbance resolution processing to execute, for example, selecting between processing that requires database access blocking and processing that does not.

The present invention is also applicable to high density blade servers which interconnect apparatus each consisting of one or more processors, one or more memories and zero or more disks through high-speed communication means, to high SMP (symmetric multiprocessing) servers having a large number of processors, and to a SAN (storage area network) building an independent network made up of only storages.

With this invention, the status analysis is performed according to the database transaction cost and appropriate disturbance resolution processing, which can eliminate the disturbance caused by a factor detected by the status analysis, is selected. This makes it possible to reduce a load imposed by the execution of the status analysis that analyzes the state of database storage areas and to efficiently select optimum disturbance resolution processing for eliminating the disturbance of the database storage areas.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A database disturbance resolution method for eliminating a disturbance of data storage areas of a database, the method comprising:
    deciding a time to execute a status analysis when a ratio of a current database transaction time to a past database transaction time measured immediately after an execution of disturbance resolution processing is in excess of a first threshold, the ratio indicating a degree of the disturbance of data storage areas of the database;
    when it is decided to be time to execute the status analysis, analyzing a status of the data storage areas of the database and outputting values corresponding to disturbance factors as a status analysis result;
    comparing the values in the status analysis result with second thresholds in a disturbance threshold list to extract a critical disturbance factor which requires a disturbance resolution, the disturbance threshold list defining each disturbance factor and a corresponding second threshold as a pair, and
    referring to a processing/factor association table to select the disturbance resolution processing capable of eliminating the disturbance caused by the extracted critical disturbance factor by rearranging the data in the data storage areas of the database.

2. A database disturbance resolution method according to claim 1, wherein, when the ratio is not in excess of the first threshold, a next status analysis execution timing is estimated from a log of database transaction time.

3. A database disturbance resolution method according to claim 1, wherein, when the ratio is not in excess of the first threshold, a next status analysis execution timing is estimated from a log of status analysis results.

4. A database disturbance resolution method according to claim 3, wherein, when a difference between a next status analysis execution timing estimated from the status analysis result log and a next status analysis execution timing estimated from a current storage state is less than a predetermined value, items of the status analysis other than those approaching the second threshold are excluded from items to be analyzed in the next status analysis.

5. A database disturbance resolution method according to claim 1, wherein, by referring to a priority table, which assigns a lower priority level to disturbance resolution processing which, when executed, imposes a greater load on the database system, processing with a highest priority level is selected from among the disturbance resolution processing capable of eliminating the disturbance caused by the extracted critical disturbance factor.

6. A database disturbance resolution method according to claim 1, wherein disturbance resolution processing with a smallest load is selected in each of cases where database access blocking is permitted and where the blocking is not permitted.

7. A database disturbance resolution method according to claim 1, wherein the current status analysis result produced is compared with a log of previous status analysis results and, if the current status analysis result matches one of the previous status analysis results, disturbance resolution processing that was selected by the matching previous status analysis result is selected.

8. A database disturbance resolution method according to claim 1, wherein information on whether or not each of the disturbance resolution processing requires database access blocking, information on a magnitude of load imposed by each processing, information on an execution time of each processing, and information on how the disturbance factors change after the execution of the associated disturbance resolution processing, are presented to an operator.

9. A database disturbance resolution method according to claim 1, wherein, in the status analysis, the data storage areas are searched while forwarded row number, 0% utilization page number, and row length are counted and the storage efficiency of the data storage areas is calculated.

10. A database management system for eliminating a disturbance of data storage areas of a database, the database system comprising:
   a status analysis execution trigger decision unit to decide a time to execute a status analysis when a ratio of a current database transaction time to a past database transaction timed measured immediately after an execution of disturbance resolution processing is in excess of a first threshold, the ratio indicating a degree of the disturbance of data storage areas of the database;
   a status analysis execution unit to, when it is decided to be time to execute the status analysis, analyze a status of the data storage areas of the database and output values corresponding to disturbance factors as a status analysis result; and
   a disturbance resolution processing selection unit to compare the values in the status analysis result with second thresholds in a disturbance threshold list to extract a critical disturbance factor which requires a disturbance resolution, the disturbance threshold list defining each disturbance factor and a corresponding second threshold as a pair, and refer to a processing/factor association table to select the disturbance resolution processing capable of eliminating the disturbance caused by the extracted critical disturbance factor by rearranging the data in the data storage areas of the database.

11. A computer readable storage medium having a program for instructing a computer to function as a database system which eliminates a disturbance of data storage areas of a database, the program comprising:
   code for deciding a time to execute a status analysis when a ratio of a current database transaction time to a past database transaction time measured immediately after an execution of disturbance resolution processing is in excess of a first threshold, the ratio indicating a degree of the disturbance of data storage areas of the database;
   code for, when it is decided to be time to execute the status analysis, analyzing a status of the data storage areas of the database and outputting values corresponding to disturbance factors as a status analysis result; and
   code for comparing the values in the status analysis result with second thresholds in a disturbance threshold list to extract a critical disturbance factor which requires a disturbance resolution, the disturbance threshold list defining each disturbance factor and a corresponding second threshold as a pair; and, referring to a processing/factor association table to select the disturbance resolution processing capable of eliminating the disturbance caused by the extracted critical disturbance factor by rearranging the data in the data storage areas of the database.

12. A database disturbance system according to claim 10, wherein the status analysis execution trigger decision unit is configured, when the ratio is not in excess of the first threshold, to estimate a next status analysis execution timing from a log of database transaction time.

13. A database disturbance system according to claim 10, wherein the status analysis execution trigger decision unit is configured, when the ratio is not in excess of the first threshold, to estimate a next status analysis execution timing from a log of status analysis results.

14. A database disturbance system according to claim 13, wherein the disturbance resolution processing selection unit is configured, when a difference between a next status analysis execution timing estimated from the status analysis result log and a next status analysis execution timing estimated from a current storage state is less than a predetermined value, to exclude items of the status analysis other than those approaching the second threshold are excluded from items to be analyzed in the next status analysis.

15. A database disturbance system according to claim 10, wherein the disturbance resolution processing selection unit is configured, by referring to a priority table, which assigns a lower priority level to disturbance resolution processing which, when executed, imposes a greater load on the database system, to select processing with a highest priority level from among the disturbance resolution processing capable of eliminating the disturbance caused by the extracted critical disturbance factor.

16. A database disturbance system according to claim 10, wherein the disturbance resolution processing selection unit is configured to select disturbance resolution processing with a smallest load in each of cases where database access blocking is permitted and where the blocking is not permitted.

17. A database disturbance system according to claim 10, wherein the disturbance resolution processing selection unit is configured, if the current status analysis result matches one of the previous status analysis results by comparing the current status analysis result produced with a log of previous status analysis results, to select disturbance resolution processing that was selected by the matching previous status analysis result.

18. A computer readable storage medium according to claim 11, wherein the code for deciding comprises code for, when the ratio is not in excess of the first threshold, estimating a next status analysis execution timing from a log of database transaction time.

19. A computer readable storage medium according to claim 11, wherein the code for deciding comprises code for, when the ratio is not in excess of the first threshold, estimating a next status analysis execution timing from a log of status analysis results.

20. A computer readable storage medium according to claim 19, wherein the code for referring comprises code for, when a difference between a next status analysis execution timing estimated from the status analysis result log and a next status analysis execution timing estimated from a current storage state is less than a predetermined value, excluding items of the status analysis other than those approaching the second threshold are excluded from items to be analyzed in the next status analysis.

21. A computer readable storage medium according to claim 11, wherein the code for referring comprises code for, by referring to a priority table, which assigns a lower priority level to disturbance resolution processing which, when executed, imposes a greater load on the database system, selecting processing with a highest priority level from among the disturbance resolution processing capable of eliminating the disturbance caused by the extracted critical disturbance factor.

22. A computer readable storage medium according to claim 11, wherein the code for referring comprises code for selecting disturbance resolution processing with a smallest load in each of cases where database access blocking is permitted and where the blocking is not permitted.

23. A computer readable storage medium according to claim 11, wherein the code for referring comprises code for, if the current status analysis result matches one of the previous status analysis results by comparing the current status analysis result produced with a log of previous status analysis results, selecting disturbance resolution processing that was selected by the matching previous status analysis result.

* * * * *